United States Patent
Hwang et al.

(10) Patent No.: US 12,043,955 B2
(45) Date of Patent: Jul. 23, 2024

(54) METHOD FOR PROCESSING CARBON FIBER BUNDLE

(71) Applicant: FORMOSA PLASTICS CORPORATION, Kaohsiung (TW)

(72) Inventors: Long-Tyan Hwang, Kaohsiung (TW); Sheng-Shiun Lin, Kaohsiung (TW); Yu-Sheng Li, Kaohsiung (TW); Ching-Cheng Chung, Kaohsiung (TW); Cheng-Chun Chou, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 83 days.

(21) Appl. No.: 17/816,319

(22) Filed: Jul. 29, 2022

(65) Prior Publication Data

US 2023/0051199 A1 Feb. 16, 2023

(30) Foreign Application Priority Data

Jul. 30, 2021 (TW) .................. 110128240

(51) Int. Cl.
*D06M 10/10* (2006.01)
*D06M 15/263* (2006.01)
*D06M 101/40* (2006.01)

(52) U.S. Cl.
CPC .......... *D06M 10/10* (2013.01); *D06M 15/263* (2013.01); *B05D 2256/00* (2013.01); *D06M 2101/40* (2013.01)

(58) Field of Classification Search
None
See application file for complete search history.

(56) References Cited

U.S. PATENT DOCUMENTS

| 6,385,828 | B1 * | 5/2002 | Kiss | .......... D02J 1/18 28/282 |
| 2009/0062426 | A1 | 3/2009 | Shiraki et al. | |
| 2013/0274413 | A1 * | 10/2013 | Ozeki | ............. B32B 5/12 427/175 |
| 2017/0145627 | A1 | 5/2017 | Sakurai et al. | |
| 2018/0002500 | A1 | 1/2018 | Nagai et al. | |
| 2018/0326627 | A1 * | 11/2018 | Ichiki | ............ B32B 5/08 |
| 2020/0123688 | A1 * | 4/2020 | Kanayama | ............ D01F 9/12 |

FOREIGN PATENT DOCUMENTS

| CN | 203559250 U | 4/2014 |
| CN | 105525466 A | 4/2016 |
| CN | 105001615 B | 4/2017 |
| CN | 107614785 A | 1/2018 |
| CN | 110042663 A | 7/2019 |
| CN | 110168161 A | 8/2019 |
| CN | 110344252 A | 10/2019 |
| CN | 110699960 A | 1/2020 |
| CN | 111670274 A | 9/2020 |
| EP | 1862281 A1 | 12/2007 |
| EP | 3246460 A1 | 11/2017 |
| JP | 2006124847 A * | 5/2006 |
| JP | 2006124847 A | 5/2006 |
| JP | 2006336131 A | 12/2006 |
| JP | 2012007280 A | 1/2012 |
| JP | 2012255232 A | 12/2012 |
| JP | 201357140 A | 3/2013 |
| JP | 2014122438 A | 7/2014 |
| JP | 2014196591 A | 10/2014 |
| JP | 2015048549 A | 3/2015 |
| KR | 20170089474 A | 8/2017 |
| TW | I703246 B | 9/2020 |
| TW | I718488 B | 2/2021 |
| TW | 202124808 A | 7/2021 |
| WO | WO2006101269 A1 | 9/2006 |
| WO | WO2012/008561 A1 | 1/2012 |
| WO | WO2020/090488 A1 | 7/2020 |

OTHER PUBLICATIONS

Isabelle Giraud et al., Preparation of aqueous dispersion of thermoplastic sizing agent for carbon fiber by emulsion/solvent evaporation, Applied Surface Science, Feb. 1, 2013, pp. 94-99, vol. 266, Amsterdam NI.

* cited by examiner

*Primary Examiner* — Michael P. Rodriguez
(74) *Attorney, Agent, or Firm* — MUNCY, GEISSLER, OLDS & LOWE, P.C.

(57) ABSTRACT

Disclosed is a method for processing a carbon fiber bundle, which can adjust bundling property, winding property and wear resistance of sizing fibers. The method includes following steps: (i) coating a sizing agent on at least one carbon fiber bundle, in which the sizing agent includes a thermoplastic resin; (ii) drying the carbon fiber bundle by hot air; and (iii) heating the carbon fiber bundle by an infrared light, in which a heating temperature of the heating is equal to or higher than a melting point of the thermoplastic resin.

15 Claims, No Drawings

METHOD FOR PROCESSING CARBON FIBER BUNDLE

CROSS-REFERENCE TO RELATED APPLICATION

This application claims priority to Taiwan Application Serial Number 110128240, filed on Jul. 30, 2021, which is herein incorporated by reference.

BACKGROUND

Field of Invention

The present disclosure relates to a method for processing carbon fiber bundle.

Description of Related Art

Current continuous fiber reinforced thermoplastic (CFRTP) composites are mainly composed of carbon fibers and a thermoplastic resin, and advantages thereof include rapid manufacturing, diverse processing and molding, recyclability, low process energy consumption, etc., quite in line with the current trend of environmental protection.

The carbon fibers have excellent mechanical properties such as high specific strength and high specific modulus, high temperature resistance, chemical resistance, low friction coefficient and high electrical conductivity, so the carbon fibers are widely used in the field of composite materials such as aviation, aerospace, sporting goods, civil construction, electronic products, medical equipment, etc. However, the carbon fibers should be sized before production and processing of the carbon fibers, such as wetting the carbon fibers with a resin, otherwise holes will appear in the formed composite material, thereby reducing mechanical properties of the composite material. In addition, during the production and processing of the carbon fibers, the carbon fibers are prone to hairiness and monofilament breakage after mechanical friction, which affect performance of the carbon fibers.

The sizing agent can form a protective film to protect surfaces of the carbon fibers to increase wear resistance and bundling property of the carbon fibers, and thereby improve adhesion strength between the carbon fibers and the resin. The sizing agent traditionally used for the carbon fibers is uncured epoxy resin, but compatibility between the uncured epoxy resin and the thermoplastic resin is usually poor, which affect performance of the composite material. Further, compatibility of the uncured epoxy resin in the sizing agent and the thermoplastic resin with low polarity such as polyolefin (e.g., polypropylene and polyethylene) and a low-reactivity functionalized engineering resin such as polyphenylene sulfide (PPS) and poly-ether-ether-ketone (PEEK) is poor, resulting in adhesion issues between the carbon fibers and the thermoplastic resin.

As can be seen from the above, in order to improve the adhesion of the carbon fibers and the thermoplastic resin, the sizing agent can be changed from the epoxy resin to a thermoplastic resin with a similar structure. However, it is known from literature that a long chain of the thermoplastic resin itself makes it less reactive, thereby reducing the adhesion between the carbon fibers and the thermoplastic resin.

Currently, there is a conjugated diene-based sizing agent with good adhesion to the thermoplastic resin, which can improve mass productivity by suppressing fuzzing of the carbon fibers during extrusion molding. This sizing agent can improve the bundling property of the carbon fibers and suppress the fuzzing during extrusion molding since it has film-forming property, but the film-forming property of this sizing agent makes it difficult to separate overlapping parts of the carbon fiber strands, resulting in hairiness.

In other sizing agents mainly composed of polyetherimide (PEI), polyimide (PI), polyaryletherketone (PAEK), with naphthone and 4,4'-biphenol as comonomer units are used. However, crystallinity of polyaryletherketone causes stiffness of the carbon fibers to be too high during continuous production of the carbon fibers, so that the carbon fibers cannot be wound up normally and tow sticking issues during yarn splitting.

In addition, although the polypropylene-based sizing agent modified by maleic anhydride can improve the adhesion between the carbon fibers and the polypropylene resin, this sizing agent starts to crystallize when it is heated and dried to its melting point and then cooled down, causing the carbon fiber bundle to be too hard and subsequent winding issues. Since this sizing agent is affected by the drying temperature to form crystals, which affects processability and spreadability of the carbon fiber bundle, it is very important to precisely control the drying temperature of this sizing agent. It is worth noting that actual temperature control accuracy of a traditional hot air heating and drying equipment is not good, and it only seeks to remove water, so it is easy to cause the crystallization issue of this sizing agent. Some other factors during processing, such as line speed, extrusion roll pressure, tow tension, sizing pick-up, sizing tank concentration, temperature and humidity changes in external environment, etc., may also cause changes in a moisture content of the carbon fiber bundle before and after drying, so that an actual surface temperature of the carbon fiber bundle changes during hot air drying, resulting in poor temperature control and different degrees of crystallization of the sizing agent, which in turn cause the carbon fiber bundle to be too hard and subsequent winding issues, which are not conducive to quality control and subsequent processing of the carbon fiber bundle.

A purpose of the present disclosure is to provide a method for processing the carbon fiber bundle to solve the issues in the art, in which the carbon fibers are precisely heated by an infrared light after drying by hot air to solve the issues of the carbon fiber hairiness and too hard phenomenon caused by the crystallization issue of the sizing agent of the carbon fibers, and to improve the carbon fiber entanglement and fuzzing issues caused by the high film-forming property of the sizing agent, so as to precisely control the stiffness and bundling property of the carbon fibers.

SUMMARY

An aspect of the present disclosure provides a method for processing a carbon fiber bundle, which includes: (i) coating a sizing agent on at least one carbon fiber bundle, in which the sizing agent includes a thermoplastic resin; (ii) drying the carbon fiber bundle by hot air; and (iii) heating the carbon fiber bundle by an infrared light, in which a heating temperature of the heating is equal to or higher than a melting point of the thermoplastic resin.

In one or more embodiments, a difference between the heating temperature of the step (iii) and the melting point of the thermoplastic resin is from 5° C. to 50° C.

In one or more embodiments, the difference between the heating temperature of the step (iii) and the melting point of the thermoplastic resin is from 10° C. to 30° C.

In one or more embodiments, the difference between the heating temperature of the step (iii) and the melting point of the thermoplastic resin is from 20° C. to 25° C.

In one or more embodiments, the method further includes grafting a modified monomer onto the thermoplastic resin.

In one or more embodiments, the modified monomer includes polyolefin-based unsaturated carboxylic acid, polyolefin-based unsaturated carboxylic acid ester, polyolefin-based unsaturated carboxylic acid anhydride, or combinations thereof.

In one or more embodiments, a melting point of the modified monomer is higher than the melting point of the thermoplastic resin, and the heating temperature of the step (iii) is between the melting point of the thermoplastic resin and the melting point of the modified monomer.

In one or more embodiments, the heating temperature of the step (iii) is higher than the melting point of the modified monomer.

In one or more embodiments, the step (ii) is performed under a temperature from 70° C. to 120° C.

In one or more embodiments, the heating temperature of the step (iii) is from 80° C. to 190° C.

In one or more embodiments, the at least one carbon fiber bundle includes a plurality of carbon fiber bundles.

In one or more embodiments, the method further includes placing the carbon fiber bundles in a plurality of grooves respectively after the step (i) and before the step (ii), so that the carbon fiber bundles are separated from each other.

In one or more embodiments, a wavelength of the infrared light of the step (iii) is from 2 μm to 4 μm.

In one or more embodiments, a residence time of the step (iii) is from 30 seconds to 90 seconds.

In one or more embodiments, a residence time of the step (iii) is from 50 seconds to 60 seconds.

DETAILED DESCRIPTION

In order to make the description of the present disclosure more detailed and complete, the following provides an illustrative description for implementation aspects and specific embodiments of the present disclosure; but this is not the only way to implement or use the specific embodiments of the present disclosure. The embodiments disclosed below can be combined or substituted with each other under beneficial circumstances, and other embodiments can also be added to one embodiment without further description or explanation. In the following description, numerous specific details are set forth in detail to enable the reader to fully understand the following embodiments. However, embodiments of the present disclosure may be practiced without these specific details.

Although a series of operations or steps are used below to describe the method disclosed herein, an order of these operations or steps should not be construed as a limitation to the present disclosure. For example, some operations or steps may be performed in a different order and/or other steps may be performed at the same time. In addition, all shown operations, steps and/or features are not required to be executed to implement an embodiment of the present disclosure. In addition, each operation or step described herein may include a plurality of sub-steps or actions.

An aspect of the present disclosure provides a method for processing a carbon fiber bundle. The method includes steps (i) to (iii). The step (i) includes coating a sizing agent on at least one carbon fiber bundle, in which the sizing agent includes a thermoplastic resin. The at least one carbon fiber bundle may include a plurality of carbon fiber bundles. In one or more embodiments, the carbon fiber bundle includes, but is not limited to, polyacrylonitrile-based carbon fibers, pitch-based carbon fibers, and/or rayon-based carbon fibers. In one embodiment, the carbon fiber bundle is polyacrylonitrile-based carbon fibers that can provide excellent quality and productivity. The type of the carbon fibers is not particularly limited, and includes but is not limited to the carbon fiber bundle with a monofilament diameter of 3 μm to 10 μm. A number of monofilaments in each carbon fiber bundle is not particularly limited, and may be, for example, 1,000 to 100,000. In one or more embodiments, when the carbon fiber reinforced composite material is formed, surface treatment may be firstly performed on the carbon fiber bundle to improve affinity or adhesion between the carbon fiber bundle and the resin. The surface treatment includes, but is not limited to, placing the carbon fiber bundle in an acidic or alkaline electrolyte for electrolytic oxidation treatment, or performing gas or liquid phase oxidation treatment on the carbon fiber bundle.

The sizing agent of the present disclosure includes a crystalline polymer resin, which means that it crystallizes at a specific temperature to form a film. Such crystalline polymer resin includes a thermoplastic resin, such as polyolefin, polyaryletherketone, polyester, polyethylene glycol, polyamide, polyphenylene sulfide, or combinations thereof. Polyolefin includes, but is not limited to, polypropylene, polyethylene, copolymer of ethylene and propylene, copolymer of propylene and 1-butene, and/or copolymer of ethylene, propylene and 1-butene. Polyester includes, but is not limited to, polyethylene terephthalate, polybutylene terephthalate. Polyamide includes, but is not limited to, polyphthalamide.

In one or more embodiments, the thermoplastic resin further includes a modified monomer grafted on the thermoplastic resin. The modified monomer may include polyolefin-based unsaturated carboxylic acid, polyolefin-based unsaturated carboxylic acid ester, polyolefin-based unsaturated carboxylic acid anhydride, or combinations thereof. Polyolefin-based unsaturated carboxylic acid includes, but are not limited to, methacrylic acid, maleic acid, fumaric acid, tetrahydrophthalic acid, itaconic acid, citraconic acid, crotonic acid and/or isocrotonic acid. Polyolefin-based unsaturated carboxylic acid ester includes, but are not limited to, methyl, ethyl or propyl monoesters or diesters of polyolefin-based unsaturated carboxylic acids. Polyolefin-based unsaturated carboxylic acid anhydride includes, but are not limited to, nadic anhydride, maleic anhydride and/or citraconic anhydride.

In one or more embodiments, the sizing agent may further include additives, such as surfactants, smoothing agents, emulsifiers, etc., to enable the sizing agent to form an emulsion, suspension or solution. In one or more embodiments, the sizing agent may further include water to adjust a concentration of the thermoplastic resin in the sizing agent, for example, adjusting the concentration of the thermoplastic resin to 0.1% by mass to 10% by mass, so as to fully infiltrate the carbon fiber bundle in the sizing agent. The above concentration adjustment can be a one-time dilution or multiple dilutions.

In one embodiment, at least one grooved groove may be provided at each of an inlet and an outlet of the sizing tank, and the carbon fiber bundles may be placed in grooves of the grooved groove to separate the carbon fiber bundles from each other, and it ensures that the carbon fiber bundles pass through the grooved groove before entering the sizing tank and after exiting the sizing tank, thereby keeping traveling directions of the carbon fiber bundles parallel and ensuring good separation of the carbon fiber bundles.

Next, the step (ii) is performed to dry the carbon fiber bundle with hot air. In one or more embodiments, the carbon fiber bundle may be placed in a hot air dryer such as a hot air oven in an air or nitrogen environment, and the carbon fiber bundle may be dried by hot air with a temperature from 70° C. to 120° C. Drying by hot air removes most of moisture in the sizing agent.

In one embodiment, at least one grooved groove may be provided at each of an inlet and an outlet of the hot air dryer, and the carbon fiber bundles may be placed in grooves of the grooved groove to separate the carbon fiber bundles from each other, and it ensures that the carbon fiber bundles pass through the grooved groove before entering the hot air dryer and after exiting the hot air dryer, thereby keeping traveling directions of the carbon fiber bundles parallel and ensuring good separation of the carbon fiber bundles.

In one or more embodiments, in order to avoid accumulation of the sizing agent on a grooved wheel and reduce generation of hairiness due to friction when the carbon fiber bundles pass through the grooved wheel, a groove depth of the grooved wheel may be designed to be 3 mm to avoid the carbon fiber bundles across different grooves of the grooved wheel. The grooves of the grooved wheel may be designed with a flat bottom to avoid changing a size of the carbon fiber bundle. A groove wall angle of the grooved wheel may be designed as a right angle to control the traveling directions of the carbon fiber bundles and avoid the carbon fiber bundles from being offset during traveling. The grooved wheel may be surface treated, which includes but is not limited to spraying gold steel grit so that a roughness average of the grooved wheel surface is 0.6 to 0.8, and/or chromium plating on the grooved wheel surface. A thickness of the chromium layer may be, for example, 0.08 to 0.1 mm, and Rockwell scale of the chromium layer may be, for example, 55-60 HRC.

In one or more embodiments, when the step (ii) is performed, tension of the carbon fiber bundle is set to be 1,000 cN/tex to 1,500 cN/tex. The tension of carbon fiber bundle may be measured by a tensiometer. When the tension of the carbon fiber bundle is greater than 1,500 cN/tex, the carbon fibers shrink excessively, resulting in insufficient wire width of the carbon fibers, and the carbon fibers excessively rub the roller, causing the carbon fibers to break or hairiness. On the other hand, when the tension of the carbon fiber bundle is less than 1,000 cN/tex, the carbon fiber bundles cannot be positioned or fixed in the grooves of the grooved wheel. A method of controlling the tension of the carbon fiber bundle includes, but is not limited to, controlling the tension of the carbon fiber bundle by controlling a ratio of driving speeds of front and rear grooved wheels.

Next, the step (iii) is performed to heat the carbon fiber bundle by an infrared light. In some embodiments, a heating temperature of the step (ii) and a heating temperature of the step (iii) may be the same or different, for example, there is a difference of 0 to 40° C. In one embodiment, the heating temperature of the step (iii) is from 80° C. to 190° C. It is worth noting that control of the heating temperature by the infrared light depends on a melting point of the sizing agent, in which the heating temperature is equal to or higher than a melting point of the thermoplastic resin. In the embodiment in which the heating temperature by the infrared light is higher than the melting point of the thermoplastic resin, a difference between the temperature of the step (iii) and the melting point of the thermoplastic resin may be 5° C. to 50° C., preferably 10° C. to 30° C., such as 20° C. or 25° C. The stiffness of the carbon fiber bundle may be adjusted by the heating the carbon fiber bundle with the infrared light. For example, if the stiffness of the carbon fiber bundle is to be increased, the temperature of the step (iii) needs to exceed the melting point of the sizing agent. On the other hand, if the stiffness of the carbon fiber bundle is to be reduced, the temperature of the step (iii) needs to be lower than the melting point of the sizing agent.

In an embodiment in which the thermoplastic resin further includes the modified monomer grafted on the thermoplastic resin, a melting point of the modified monomer is higher than the melting point of the thermoplastic resin, and the heating temperature of the step (iii) may be between the melting point of the thermoplastic resin and the melting point of the modified monomer. However, in another embodiment, the heating temperature of the step (iii) may be higher than the melting point of the modified monomer, and a difference between the temperature of the step (iii) and the melting point of the modified monomer may be 5° C. to 10° C.

The step (iii) includes heating the carbon fiber bundle by the infrared light with an infrared dryer such as an infrared oven. In some embodiments, a halogen lamp may be used in an infrared dryer to emit infrared light to heat the carbon fiber bundle. In some embodiments, a wavelength of the infrared light is preferably from 2 μm to 4 μm. In one embodiment, a carding device is arranged behind the infrared dryer, and a silk path is stabilized by the last grooved wheel of the hot air dryer and the carding device to avoid the carbon fiber bundles rubbing against each other and generating hairiness. In one embodiment, a distance between the outlet of the hot air dryer and an inlet of the infrared dryer is at least 1 m to avoid temperature interference between the hot air dryer and the infrared dryer and to facilitate operation. A residence time of the step (iii) is from 30 seconds to 90 seconds, preferably from 50 seconds to 60 seconds.

After the step (iii), the method further includes winding up the carbon fiber bundle. In production winding up and subsequent composite material processing applications, the stiffness of the carbon fiber bundle should be from 50 g to 100 g, preferably from 70 g to 90 g. If the stiffness of the carbon fiber is too high, it is difficult for the carbon fiber bundle to be wound up, and it is unfavorable to spread and infiltrate the yarn during subsequent formation of the composite material. If the stiffness of the carbon fiber bundle is too low, the film-forming property of the sizing agent is too low, resulting in insufficient protection of the carbon fiber bundle by the sizing agent and low bundling property of the carbon fiber bundle.

The following experimental examples are used to describe specific aspects of the present disclosure in detail, and to enable the person having ordinary skill in the art to implement the present disclosure. However, the following experimental examples are not intended to limit the present disclosure.

The sizing liquids were polymer water-based sizing liquids, which were polyolefin-based sizing liquid A and sizing liquid B provided by Mitsui Chemicals. The sizing liquid A and the sizing liquid B had a thermoplastic resin (melting point of 80° C. or 100° C., depending on a specific structure) and a modified monomer grafted on the thermoplastic resin (melting point of 100° C. or 130° C., depending on a specific structure). The compositions of the sizing liquid A and the sizing liquid B could be referred to Taiwan Patent No. TWI703246B, which is hereby incorporated by reference in its entirety. The carbon fiber bundle was conventional carbon fiber specification TC24K-35R of Formosa Plastics. Before the following experimental examples were performed, a traditional epoxy resin sizing agent originally on a surface of the carbon fiber bundle was removed under 600° C. with a residence time of 180 seconds, and the method for processing the carbon fiber bundle of the present disclosure was then carried out.

Embodiment 1: The desized carbon fiber bundle was immersed in the sizing liquid A with a concentration of 3.2% for about 36 seconds at a linear speed of 1.0 m/min and a sizing tention lowered to 800 cN, and the excess sizing agent and water were removed through a squeezing wheel. It was dried in an oven at 120° C. for 3 minutes and then treated with an infrared heater at 100° C. for 0.9 minutes. The obtained carbon fiber bundle had acceptable bundling property, good hairiness property, and stiffness of 90 g.

Embodiment 2: The desized carbon fiber bundle was immersed in the sizing liquid A with the concentration of 3.2% for about 36 seconds at the linear speed of 1.0 m/min and the sizing tension of 800 cN, and, and the excess sizing agent and water were removed through a squeezing wheel. It was dried in the oven at 120° C. for 3 minutes, and then treated with the infrared heater at 90° C. for 0.9 minutes. The obtained carbon fiber bundle had acceptable bundling property, good hairiness property, and stiffness of 84 g.

Embodiment 3: The desized carbon fiber bundle was immersed in the sizing liquid A with the concentration of 3.2% for about 36 seconds at the linear speed of 1.0 m/min and the sizing tension of 1,000 cN, and, and the excess sizing agent and water were removed through a squeezing wheel. It was dried in the oven at 100° C. for 3 minutes, and then treated with the infrared heater at 100° C. for 0.9 minutes. The obtained carbon fiber bundle had acceptable bundling property, good hairiness property, and stiffness of 91 g.

Embodiment 4: The desized carbon fiber bundle was immersed in the sizing liquid A with the concentration of 3.2% for about 36 seconds at the linear speed of 1.0 m/min and the sizing tension of 1,000 cN, and the excess sizing agent and water were removed through the squeezing wheel. It was dried in the oven at 100° C. for 3 minutes, and then treated with the infrared heater at 140° C. for 0.9 minutes. The obtained carbon fiber bundle had too high bundling property, good hairiness property, and stiffness of 141 g.

Embodiment 5: The desized carbon fiber bundle was immersed in the sizing liquid B with a concentration of 3.2% for about 36 seconds at the linear speed of 1.0 m/min and the tension of 1,000 cN, and the excess sizing agent and water were removed through the squeezing wheel. It was dried in the oven at 100° C. for 3 minutes, and then treated with the infrared heater at 100° C. for 0.9 minutes. The obtained carbon fiber bundle had acceptable bundling property, good hairiness property, and stiffness of 75 g.

Embodiment 6: The desized carbon fiber bundle was immersed in the sizing liquid B with the concentration of 3.2% for about 36 seconds at the linear speed of 1.0 m/min and the tension of 1,000 cN, and the excess sizing agent and water were removed through the squeezing wheel. It was dried in the oven at 120° C. for 3 minutes, and then treated with the infrared heater at 110° C. for 0.9 minutes. The obtained carbon fiber bundle had acceptable bundling property, good hairiness property, and stiffness of 85 g.

Embodiment 7: The desized carbon fiber bundle was immersed in the sizing liquid B with the concentration of 3.2% for about 36 seconds at the linear speed of 1.0 m/min and the tension of 1,000 cN, and the excess sizing agent and water were removed through the squeezing wheel. It was dried in the oven at 100° C. for 3 minutes, and then treated with the infrared heater at 120° C. for 0.9 minutes. The obtained carbon fiber bundle had acceptable bundling property, good hairiness property, and stiffness of 98 g.

Embodiment 8: The desized carbon fiber bundle was immersed in the sizing liquid B with the concentration of 3.2% for about 36 seconds at the linear speed of 1.0 m/min and the tension of 1,000 cN, and the excess sizing agent and water were removed through the squeezing wheel. It was dried in the oven at 100° C. for 3 minutes, and then treated with the infrared heater at 140° C. for 0.9 minutes. The obtained carbon fiber bundle had too high bundling property, good hairiness property, and stiffness of 152 g.

Comparative Example 1: The desized carbon fiber bundle was immersed in the sizing liquid A with the concentration of 3.2% for about 60 seconds at a linear speed of 0.6 m/min, and the excess sizing agent and water were removed through the squeezing wheel. It was dried in the oven at 100° C. for 5 minutes. The obtained carbon fiber bundle had acceptable bundling property, good hairiness property, and stiffness of 80 g.

Comparative Example 2: The desized carbon fiber bundle was immersed in the sizing liquid A with the concentration of 3.2% for about 36 seconds at the linear speed of 1.0 m/min, and the excess sizing agent and water were removed through the squeezing wheel. It was dried in the oven at 100° C. for 3 minutes. The obtained carbon fiber bundle had poor bundling property, poor hairiness property, and stiffness of 15 g. Only water was removed, but the temperature did not reach crystallization and film formation, resulting in poor hairiness property and poor stiffness.

Comparative Example 3: The desized carbon fiber bundle was immersed in the sizing liquid A with the concentration of 3.2% for about 60 seconds at the linear speed of 0.6 m/min, and the excess sizing agent and water were removed through the squeezing wheel. It was dried in the oven at 120° C. for 5 minutes. The obtained carbon fiber bundle had high bundling property, good hairiness property, and stiffness of 113 g.

Comparative Example 4: The desized carbon fiber bundle was immersed in the sizing liquid A with the concentration of 3.2% for about 36 seconds at the linear speed of 1.0 m/min and the sizing tension lowered to 800 cN to reduce friction, and the excess sizing agent and water were removed through the squeezing wheel. It was dried in the oven at 120° C. for 3 minutes. The obtained carbon fiber bundle had poor bundling property, poor hairiness property, and stiffness of 30 g. The residence time after drying was not enough to crystallize to form a film, resulting in poor hairiness property and poor stiffness.

Comparative Example 5: The desized carbon fiber bundle was immersed in the sizing liquid A with the concentration of 3.2% for about 36 seconds at the linear speed of 1.0 m/min and the sizing tension lowered to to 800 cN to reduce friction, and the excess sizing agent and water were removed through the squeezing wheel. It was dried in the oven at 140° C. for 3 minutes. The obtained carbon fiber bundle had too high bundling property, acceptable hairiness property, and stiffness of 127 g. After drying, it crystallized to form a film, and the stiffness was too high.

Comparative Example 6: The desized carbon fiber bundle was immersed in the sizing liquid A with the concentration of 3.2% for about 36 seconds at the linear speed of 1.0 m/min and the sizing tension lowered to 800 cN to reduce friction, and the excess sizing agent and water were removed through the squeezing wheel. It was dried in the oven at 160° C. for 3 minutes. The obtained carbon fiber bundle had too high bundling property, acceptable hairiness property, and stiffness of 151 g. After drying, crystallization and film formation were good, and the stiffness was too high.

Comparative Example 7: The desized carbon fiber bundle was immersed in the sizing liquid A with the concentration of 3.2% for about 36 seconds at the linear speed of 1.0 m/min and the sizing tension lowered to 800 cN to reduce friction, and the excess sizing agent and water were removed through the squeezing wheel. It was dried in the oven at 160° C. for 3 minutes, and then treated with the infrared heater at 100° C. for 0.9 minutes. The obtained carbon fiber bundle had too high bundling property, acceptable hairiness property, and stiffness of 155 g. After drying, crystallization and film formation were good, and the stiffness was too high.

Comparative Example 8: The desized carbon fiber bundle was immersed in the sizing liquid B with the concentration of 3.2% for about 36 seconds at the linear speed of 1.0 m/min, and the excess sizing agent and water were removed through the squeezing wheel. It was dried in the oven at 100° C. for 3 minutes. The obtained carbon fiber bundle had poor bundling property, poor hairiness property, and stiffness of 37 g. Only water was removed, but the temperature did not reach crystallization and film formation, resulting in poor hairiness property and poor stiffness.

Comparative Example 9: The desized carbon fiber bundle was immersed in the sizing liquid B with the concentration of 3.2% for about 36 seconds at the linear speed of 1.0 m/min, and the excess sizing agent and water were removed through the squeezing wheel. It was dried in the oven at 120° C. for 3 minutes. The obtained carbon fiber bundle had high bundling property, good hairiness property, and stiffness of 110 g. The temperature of the hot oven was too high, and the sizing liquid had been fully crystallized to form a film, and there was no room for adjustment of the infrared heater.

The relevant processing conditions and test results of the above-mentioned embodiments and comparative examples are respectively listed in Table 1 and Table 2. The melting point of the sizing agent was measured by differential scanning calorimetry (DSC). A calculation method of moisture content of the carbon fiber bundle before and after drying by hot air and infrared heating treatment was moisture content=(W1−W2)/W2*100%, in which W1 was a weight of the wet carbon fiber bundle after sizing and squeezing, and W2 was a weight of the carbon fiber bundle after removing water at 105° C. for 30 minutes. The bundle temperature of the carbon fiber bundle was measured using an infrared thermal imager at an upper outlet of the hot air oven, which could be FLIR (manufacturer Teledyne FLIR LLC) C3 or higher grade equipment. A calculation method of sizing pick-up (SPU) was SPU=(W3−W4)/W4*100%, in which W3 was a weight of the carbon fiber bundle with a coiling length of 1 m, and W4 was the coiled carbon fiber bundle placed in a high temperature furnace of 400° C. for 40 minutes and then cooled and weighed.

Wear property could be determined by collecting hairiness of the carbon fiber bundle. A detection method was to make the carbon fiber bundle to be tested pass through 7 metal rollers without special surface treatment and without transmission under a condition of yarn output tension of 600 cN and travel 30 m. At least two sponge pads were arranged at an outlet to collect the hairiness generated by the carbon fiber bundle due to wear, and the accumulated hairiness was dried at 105° C. for 40 minutes and weighed, in which a weight unit of the hairiness was mg.

A stiffness test method of the carbon fiber was to lay the carbon fiber over a gap formed by two platforms, and force was applied to bend the carbon fiber, and record the force (unit: g) required when the carbon fiber was successfully bent, namely the stiffness of the carbon fiber.

In Embodiments 1 to 8, the carbon fiber bundle was dried by hot air and further heated by the infrared light, in which the heating temperature of the infrared heating was equal to or higher than the melting point of the thermoplastic resin. It could be seen from Table 1 that Embodiments 1 to 8 had good bundling property, no wear issue, and moderate stiffness, which were beneficial to subsequent winding up and quality control and subsequent processing of the carbon fiber bundle.

In contrast, Comparative Examples 1-6 and Comparative Examples 8-9 had no subsequent infrared heating treatment after the carbon fiber was dried by hot air. From Table 1, it could be seen that the bundling property was generally poor, and some of Comparative examples had wear issues and the stiffness thereof was too low or too high, which were not conducive to subsequent winding up and quality control and subsequent processing of the carbon fiber bundle. In addition, although the carbon fiber bundle in Comparative Example 7 was dried by hot air and then heated by the infrared light, the drying temperature by hot air in Comparative Example 7 was too high (160° C.), resulting in very high stiffness of the carbon fiber bundle, which was not conducive to subsequent processing.

TABLE 1

|  | Embodiment | | | | | | | |
| --- | --- | --- | --- | --- | --- | --- | --- | --- |
|  | 1 | 2 | 3 | 4 | 5 | 6 | 7 | 8 |
| Code of Sizing Agent | A | A | A | A | B | B | B | B |
| Type of Sizing Agent | Polyolefin | | | | | | | |
| Tm (° C.) of Sizing Agent | 80, 130 | 80, 130 | 80, 130 | 80, 130 | 100, 130 | 100, 130 | 100, 130 | 100, 130 |
| Sizing Tension (cN) | 800 | 800 | 1000 | 1000 | 1000 | 1000 | 800 | 800 |
| Moisture Content (%) | 14.4 | 14.4 | 10.3 | 10.3 | 11.1 | 11.4 | 16.7 | 16.7 |
| Linear Speed (m/min) | 1.0 | 1.0 | 1.0 | 1.0 | 1.0 | 1.0 | 1.0 | 1.0 |
| Oven Temperature (° C.) | 120 | 120 | 100 | 100 | 100 | 120 | 100 | 100 |
| Residence Time (min) | 3 | 3 | 3 | 3 | 3 | 3 | 3 | 3 |
| Bundle Temperature (° C.) | 82 | 84 | 76 | 75 | 79 | 110 | 80 | 81 |
| Bundle Moisture Content (%) | 0.15 | 0.13 | 0.2 | 0.2 | 0.03 | 0.03 | 0.03 | 0.03 |
| Infrared Heating Temperature (° C.) | 100 | 90 | 100 | 140 | 100 | 110 | 120 | 140 |
| Residence Time (min) | 0.9 | 0.9 | 0.9 | 0.9 | 0.9 | 0.9 | 0.9 | 0.9 |
| SPU (%) | 1.25 | 1.24 | 1.18 | 1.18 | 1.17 | 1.16 | 1.18 | 1.18 |
| Bundling Property | acceptable ○ | acceptable ○ | acceptable ○ | too high ⊚+ | acceptable ○ | acceptable ○ | acceptable ○ | too high ⊚+ |
| Wear Property (mg) | 0 | 0 | 0 | 0 | 0 | 0 | 0 | 0 |
| Stiffness (g) | 90 | 84 | 91 | 149 | 75 | 85 | 98 | 152 |

TABLE 2

| | Comparative Example | | | | | | | | |
|---|---|---|---|---|---|---|---|---|---|
| | 1 | 2 | 3 | 4 | 5 | 6 | 7 | 8 | 9 |
| Code of Sizing Agent | A | A | A | A | A | A | A | B | B |
| Type of Sizing Agent | | | | | Polyolefin | | | | |
| Tm (° C.) of Sizing Agent | 80, 130 | 80, 130 | 80, 130 | 80, 130 | 80, 130 | 80, 130 | 80, 130 | 100, 130 | 100, 130 |
| Sizing Tension (cN) | 1000 | 1000 | 1000 | 800 | 800 | 800 | 800 | 1000 | 1000 |
| Moisture Content (%) | 9.4 | 10.1 | 9.7 | 14.4 | 15.1 | 14.5 | 14.6 | 11.3 | 11.3 |
| Linear Speed (m/min) | 0.6 | 1.0 | 0.6 | 1.0 | 1.0 | 1.0 | 1.0 | 1.0 | 1.0 |
| Oven Temperature (° C.) | 100 | 100 | 120 | 120 | 140 | 160 | 160 | 100 | 120 |
| Residence Time (min) | 5 | 3 | 5 | 3 | 3 | 3 | 3 | 3 | 3 |
| Bundle Temperature (° C.) | 90 | 75 | 113 | 81 | 121 | 132 | 132 | 77 | 109 |
| Bundle Moisture Content (%) | 0.1 | 0.2 | 0.10 | 0.2 | 0.06 | 0.05 | 0.04 | 0.03 | 0.03 |
| Infrared Heating Temperature (° C.) | — | — | — | — | — | — | 100 | — | — |
| Residence Time (min) | — | — | — | — | — | — | 0.9 | — | — |
| SPU (%) | 1.21 | 1.19 | 1.24 | 1.26 | 1.25 | 1.27 | 1.27 | 1.15 | 1.15 |
| Bundling Property | acceptable ○ | poor X | high ◎ | poor X | too high ◎+ | too high ◎+ | too high ◎+ | poor X | high ◎ |
| Wear Property (mg) | 0 | 3.1 | 0 | 2.4 | 0 | 0 | 0 | 2.2 | 0 |
| Stiffness (g) | 80 | 15 | 113 | 30 | 127 | 151 | 155 | 37 | 110 |

The bundle property in Tables 1 and 2 were evaluated by the stiffness of the carbon fiber bundle of average wire width per 10 mm, and the unit is g/10 mm. The bundling property >12 g/mm could be regarded that the bundling property was too high (indicated by "◎+"), which would cause difficulties in carbon fiber yarn spreading. The bundling property of 10-12 g/mm could be regarded that the bundling property was high (indicated by "◎"), and there would be an issue that the carbon fiber yarn was not easy to spread. The bundling property of 6-9 g/mm indicated that the bundling property was acceptable (indicated by "○"), which was beneficial to subsequent processing and applications. The bundling property <6 g/mm indicated that the bundling property was poor (indicated by "X"), which was not conducive to subsequent applications.

To sum up, the present disclosure provides the method for manufacturing the carbon fiber bundle, in which the carbon fibers are precisely heated by the infrared light after drying by hot air to solve the issues of the carbon fiber hairiness and too hard phenomenon caused by the crystallization issue of the sizing agent of the carbon fibers, and to improve the carbon fiber entanglement and fuzzing issues caused by the high film-forming property of the sizing agent, so as to precisely control stiffness and bundling property of the carbon fibers.

The foregoing summarizes the features of several embodiments or examples so that aspects of the present disclosure may be better understood by those skilled in the art. Those skilled in the art should appreciate that they may readily use the present disclosure as a basis for designing or modifying other processes and structures for carrying out the same purposes and/or achieving the same advantages of the embodiments described herein. Those skilled in the art should also realize that these equivalent constructions do not depart from the spirit and scope of the present disclosure, and that they can make various changes, substitutions and alterations herein without departing from the spirit and scope of the present disclosure.

What is claimed is:

1. A method for processing a carbon fiber bundle, comprising:
    (i) coating a sizing agent on at least one carbon fiber bundle, wherein the sizing agent comprises a thermoplastic resin;
    (ii) drying the carbon fiber bundle by hot air, wherein a tension of the carbon fiber bundle is set to be 1,000 cN/tex to 1,500 cN/tex; and
    (iii) heating the carbon fiber bundle by an infrared light, wherein a heating temperature of the heating is equal to or higher than a melting point of the thermoplastic resin.

2. The method of claim 1, wherein a difference between the heating temperature of the step (iii) and the melting point of the thermoplastic resin is from 5° C. to 50° C.

3. The method of claim 2, wherein the difference between the heating temperature of the step (iii) and the melting point of the thermoplastic resin is from 10° C. to 30° C.

4. The method of claim 3, wherein the difference between the heating temperature of the step (iii) and the melting point of the thermoplastic resin is from 20° C. to 25° C.

5. The method of claim 1, further comprising grafting a modified monomer onto the thermoplastic resin.

6. The method of claim 5, wherein the modified monomer comprises polyolefin-based unsaturated carboxylic acid, polyolefin-based unsaturated carboxylic acid ester, polyolefin-based unsaturated carboxylic acid anhydride, or combinations thereof.

7. The method of claim 6, wherein a melting point of the modified monomer is higher than the melting point of the thermoplastic resin, and the heating temperature of the step (iii) is between the melting point of the thermoplastic resin and the melting point of the modified monomer.

8. The method of claim 6, wherein the heating temperature of the step (iii) is higher than the melting point of the modified monomer.

9. The method of claim 1, wherein the step (ii) is performed under a temperature from 70° C. to 120° C.

10. The method of claim 1, wherein the heating temperature of the step (iii) is from 80° C. to 190° C.

11. The method of claim 1, wherein the at least one carbon fiber bundle comprises a plurality of carbon fiber bundles.

12. The method of claim 11, further comprising placing the carbon fiber bundles in a plurality of grooves respectively after the step (i) and before the step (ii), so that the carbon fiber bundles are separated from each other.

13. The method of claim 1, wherein a wavelength of the infrared light of the step (iii) is from 2 μm to 4 μm.

14. The method of claim 1, wherein a residence time of the step (iii) is from 30 seconds to 90 seconds.

15. The method of claim 14, wherein the residence time of the step (iii) is from 50 seconds to 60 seconds.

* * * * *